United States Patent
Dashevskiy et al.

(10) Patent No.: US 8,589,990 B2
(45) Date of Patent: Nov. 19, 2013

(54) DEMONSTRATION SYSTEM FOR ELECTRONIC DEVICES

(75) Inventors: Leonid Dashevskiy, Alpharetta, GA (US); Trevor Davies, Lawrenceville, GA (US); Robert Nicholson, Cumming, GA (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 13/323,124

(22) Filed: Dec. 12, 2011

(65) Prior Publication Data
US 2012/0324514 A1    Dec. 20, 2012

Related U.S. Application Data

(60) Provisional application No. 61/496,735, filed on Jun. 14, 2011.

(51) Int. Cl.
*H04N 7/18*        (2006.01)

(52) U.S. Cl.
USPC ............................................. 725/78; 348/734

(58) Field of Classification Search
USPC ....................................... 725/78–85; 348/734
See application file for complete search history.

(56) References Cited

U.S. PATENT DOCUMENTS

| | | | |
|---|---|---|---|
| 6,437,836 B1 | 8/2002 | Huang et al. | |
| 7,492,278 B2 * | 2/2009 | Zigmond et al. | 340/12.52 |
| RE41,453 E | 7/2010 | Wall et al. | |
| 7,898,393 B2 * | 3/2011 | McMillan et al. | 340/323 R |
| 8,014,768 B2 | 9/2011 | Ackley | |
| 2004/0047599 A1 | 3/2004 | Grzeczkowski | |
| 2009/0298535 A1 | 12/2009 | Klein et al. | |
| 2011/0223899 A1 | 9/2011 | Hiraide | |

OTHER PUBLICATIONS

Frommer, Dan, 15 Things You Can Remote Control With Your Phone, Business Insider, Jul. 21, 2009.
Boehret, Katherine, The All-In-One Remote, The Digital Solution, Jul. 28, 2010.

* cited by examiner

*Primary Examiner* — Annan Shang
(74) *Attorney, Agent, or Firm* — Miller Patent Services; Jerry A. Miller

(57) ABSTRACT

A demonstration arrangement for controlling a plurality of television sets or other controllable electronic devices has one or more programmed processors. A control interface is adapted to receive user commands. The processors are programmed to, upon receipt of user commands: select one or more television sets or groups of television sets while leaving others of the television sets unselected; select one of the content sources; and send signals that cause the selected content sources to be displayed by the selected one or more television sets or groups of television sets without affecting operation of unselected television sets or groups of television sets. This abstract is not to be considered limiting, since other embodiments may deviate from the features described in this abstract.

34 Claims, 12 Drawing Sheets

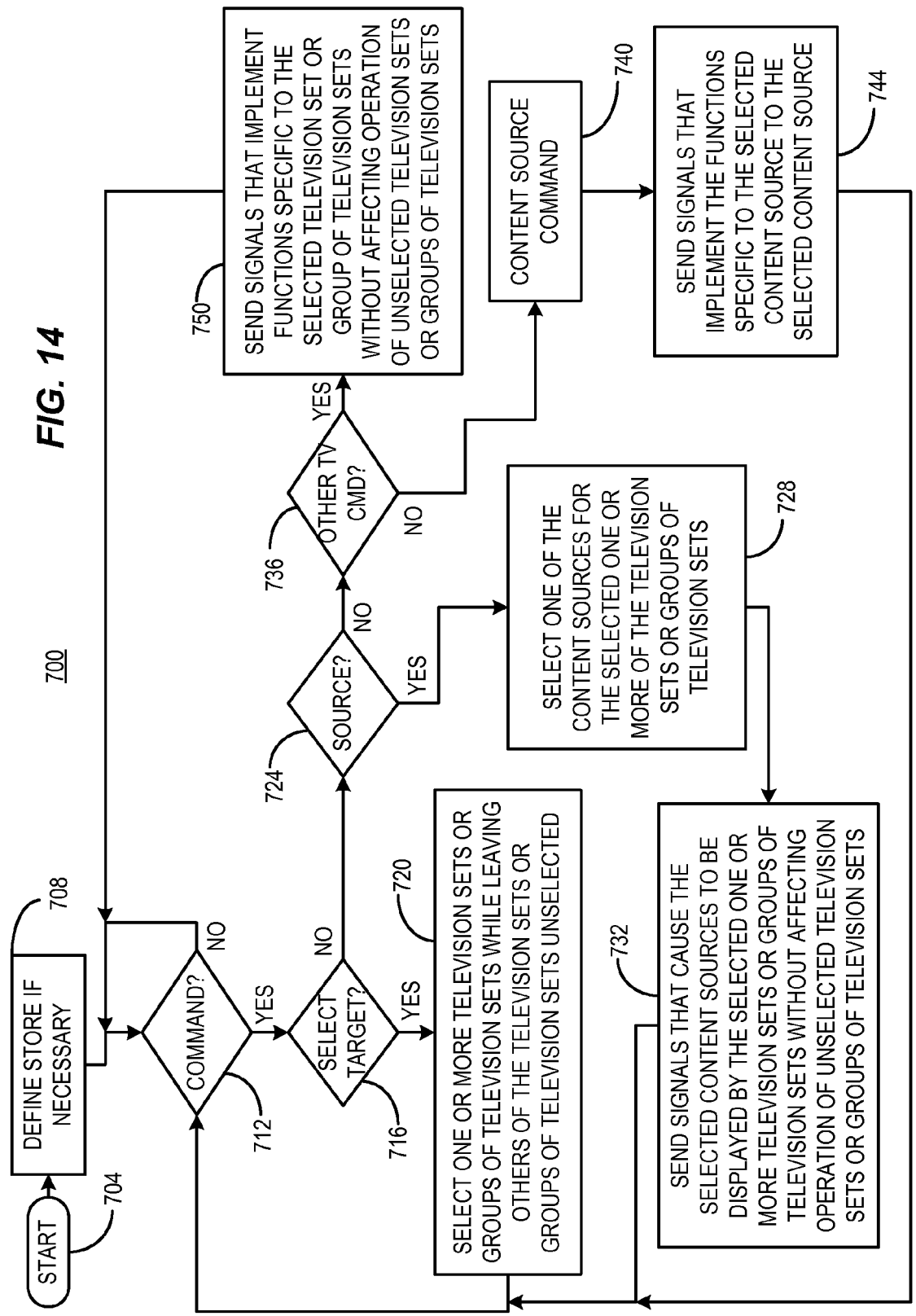

DEMONSTRATION SYSTEM FOR ELECTRONIC DEVICES

CROSS REFERENCE TO RELATED DOCUMENTS

This application is related to and claims priority benefit of U.S. Provisional Patent Application No. 61/496,735 filed Jun. 14, 2011 which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

When one is shopping for a home electronics device such as a television set, direct comparison of performance attributes and features can be difficult when multiple devices are situated in close proximity. For example, if one is in a display room having multiple rows or walls (used interchangeably herein) with multiple television sets on each wall, a user's actuation of one control command on a remote control can create unpredictable results since the infrared (IR) signals commonly used to control a television (TV) may control multiple TV's simultaneously creating a confusing environment where an attempt to control one TV results in undesired changes to multiple TVs. Consider, for example, a wall of compatible TV sets each of which responds to an IR command to increment the input source selection or channel. In such a case, each TV that receives the command will increment to the next available input or channel rendering it frustrating to attempt to put all devices on the same input or same channel so as to be able to produce an "apples to apples" comparison of the TVs.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 14 is a generalized example of a process for control of one or more TV devices in a manner consistent with certain embodiments of the present invention.

DETAILED DESCRIPTION

Figure 1:
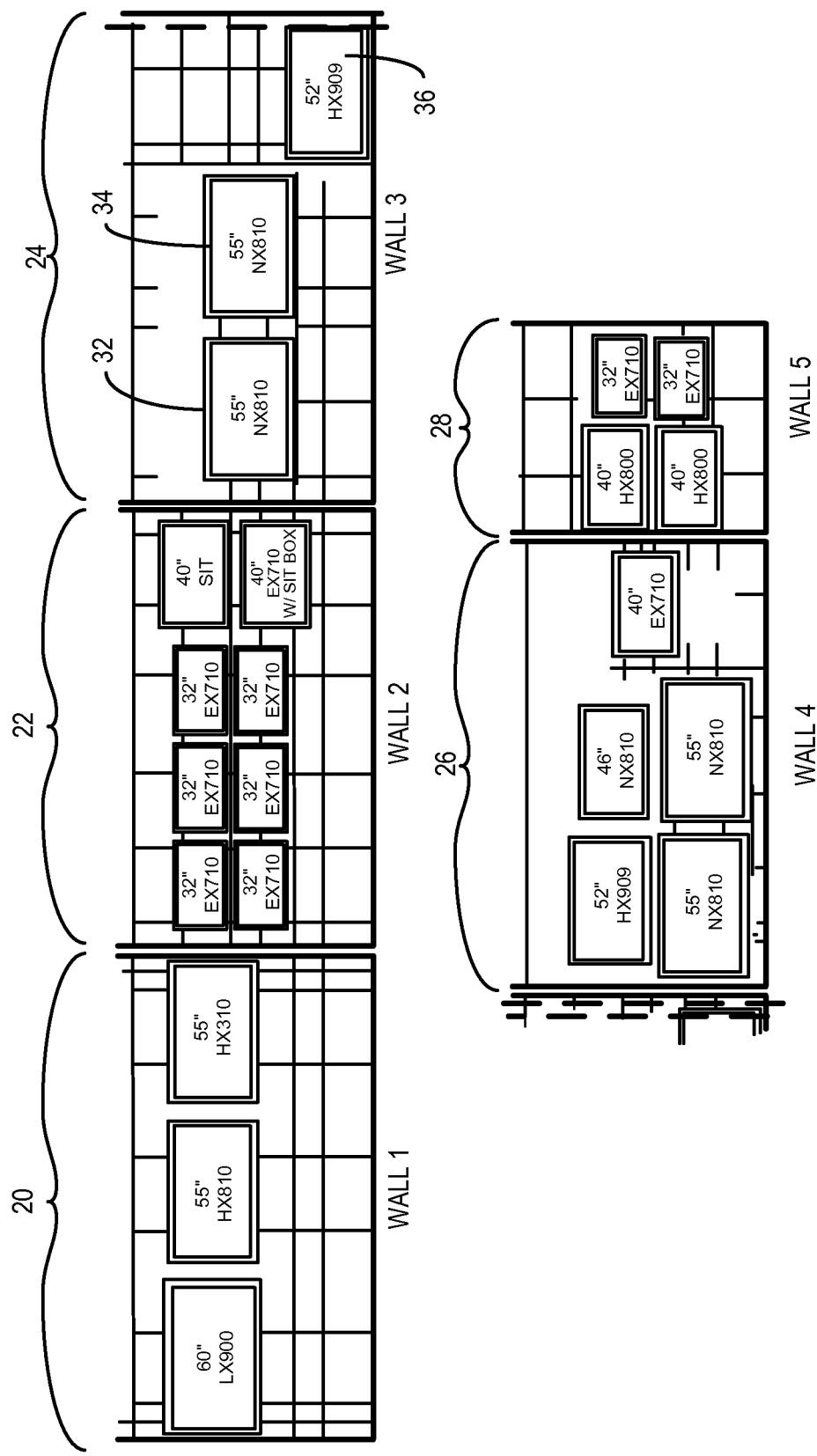
FIG. 1 is an example of a store display arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. In this discussion, the use of the term "Program" is generally consistent with that of the MPEG-2 Systems standard (ISO/IEC 13818-1). The program content itself, however, can be encoded in any suitable manner including MPEG-2, MPEG-4 or even analog without departing from the spirit and intent of the present document. By way of example, an MPEG-2 Program has the associated Elementary Stream components, such as for example one video Elementary Stream and one or more audio Elementary Streams. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As previously noted, when one is shopping for a home electronics device such as a television set, direct comparison of performance attributes and features can be difficult when multiple devices are situated in close proximity For example, if one is in a display room having multiple rows or walls (used interchangeably herein) with multiple television sets on each wall, a user's actuation of one control command on a remote control can create unpredictable results since the infrared (IR) signals commonly used to control a television (TV) may control multiple TV's simultaneously creating a confusing environment where an attempt to control one TV results in undesired changes to multiple TVs. Consider, for example, a wall of remote control code compatible TV sets each of which responds to an IR command to increment the input source selection or channel. In such a case, each TV that receives the command will increment to the next available input or channel. If several inputs or channels are selected for the various television sets, attempts to synchronize the channel or input for multiple TVs may be frustrating rendering it difficult to produce an "apples-to-apples" comparison of the TVs.

While the present description is provided in terms of control of individual and groups of TV's to demonstrate features of the TV's independently of each other, any controllable I/O device can be manipulated in the manner described, e.g., distributed sources/distributed display, in retail and other areas such as sports facilities and public areas, etc.

In a preferred implementation, a tablet computer can be used as a controlling device/user interface, but other devices can be marshaled into service to accomplish the same results such as WiFi enabled wired or wireless tablets, personal digital assistants or telephones, etc.

Multiple devices such as a group of television sets or selected individual television sets can be selected and controlled by using a web enabled tablet or smart phone or tablet as a remote control for display of video content. The web enabled smart phone or tablet user accesses one or more TVs on a retail TV wall display using a remote control application. The application can independently control one or more TVs or walls of TVs with groups of televisions in each of the walls.

By touching the walls displayed on the smart phone or tablet display a particular wall or TV can be selected by simply touching the television button (individual or all TV's) on the selected walls, the user can control the select/control the video content on those television displays.

In certain preferred implementations, the TV control application is accessed using web-enabled devices using the icons or port addresses (smart phone, cell, etc) to get the application screen (main store Screen) on the controlling device. Controlling the Wall TV or TVs using this TV wall control application can then be accomplished by navigating to individual wall and selecting the TV or TV's (individual or group of TV's).

A realization of an embodiment consistent with the present invention can be used advantageously by a salesperson to provide a potential customer with the ability to comparison shop in an efficient and useful manner. Consider for example the following example demonstration scenario.

Turning first to FIG. 1, a retail television display layout is depicted as an arrangement of five "walls". It is noted that throughout this document, the term "wall" is used loosely in that it is intended to mean a display arrangement containing one or multiple television sets or other controlled devices. For example, a store's end cap or shelf system not forming a "wall" per se would be considered a "wall" for purposes of the present document. Similarly, in the case of very large format television sets, a "wall" may actually be one or more showroom floor locations such as a large format television residing on a podium or a collection of TVs on an array of podia. The intent is that the term "wall" be used to embrace a logical geographic arrangement of one or more devices on display. In the example presented herein, it is further logical that the display encompass a collection of television sets that incorporate the same class of display by size, e.g., 21 inch class displays are generally displayed together or with displays of similar size class since generally a customer is trying to compare displays of like or similar size. Similarly, one might be trying to decide between a similar but not identical size class TVs such as between a 42 inch class and a 46 inch class within similar budget ranges. Hence, the size class is not a hard and fast rule, but is generally in keeping with the consumer's shopping needs and desire to compare similar products.

In FIG. 1, five walls are depicted 20, 22, 24, 26 and 28, each of which are used to display a collection of TVs such as 32, 34 and 36 of wall 3. Each of the other walls similarly carry a plurality of TVs. It would be desirable to be able to either individually control a single TV, a selected group of TVs or all TVs on a particular wall simultaneously without affecting the other TVs in near proximity of either direct or indirect IR controller range (e.g., inadvertent control of multiple TVs that are not intended to be controlled either by direct or reflected IR signals from a conventional remote controller).

In accord with certain implementations consistent with certain embodiments of the present invention, a tablet computer such as a Sony S1™ Tablet or smart phone such as the commercially available Android™ OS Sony XPERIA™ X-10 can be used as a TV Wall remote control (or as an interface to a controller that is contacted via a WiFi signal from the tablet. In this example, the touchscreen of the smart phone can display a depiction of the wall layout that is custom programmed for the particular retail environment. This can be depicted as shown, for example in FIG. 2. In this example, while five walls of displayed TVs are present, limitations of the size of the display 42 of the smart phone may dictate that the full layout is to be scrolled to be accessed.

A particular wall can be selected by touching the wall or the icon that names the wall on the touchscreen. So, if the user desires to see a comparison of all of the TVs in wall 3, the "wall 3" icon 46 can be touched. The user can then execute a demonstration of all of the televisions on the wall simultaneously. However, if the user only wishes to select one or two of the TVs, the user merely touches those TVs that are desired. Future commands such as the TV channel or source or volume or other television specific features can then be enabled for comparison. For example, all other TVs may be set to "off" and the TVs on wall 3 are turned on. A particular source can be selected and each TV can be cycled through a demonstration of its various features using smart phone 48. In this example embodiment, smart phone (or tablet, etc.) 48 communicates with a controller that controls each television using either IR control signals that are transmitted directly to each TV in a manner that permits no stray IR from reflecting to other TVs, or in another implementation, the application directly sends information to an address or addresses associated with the TV or TVs to be controlled. In all cases, it is desirable to use stateless control commands so that there is no possibility of the various controlled device to get out of synchronization with one another (i.e., a change to channel 5.1 would be a direct stateless instruction to go to channel 5.1—a command that does not depend upon the current channel state—rather than using a state dependent up or down channel command), however, stateful and state dependent commands can also be utilized in variations consistent with implementations of the present invention without limitation.

In this example, to access the TV wall remote control application the user would direct the browser of the wireless telephone or tablet to an address assigned to the wall remote control such as address 192.168.98.6/ index.asp. This address, in this embodiment, leads to a web page residing on a processor on the network and provides a graphic representation of the "store" and all of its relevant walls as depicted in FIG. 2 to the icon on controlling device's main screen so that the image of FIG. 2 appears on the screen after the page loads.

Figure 2:
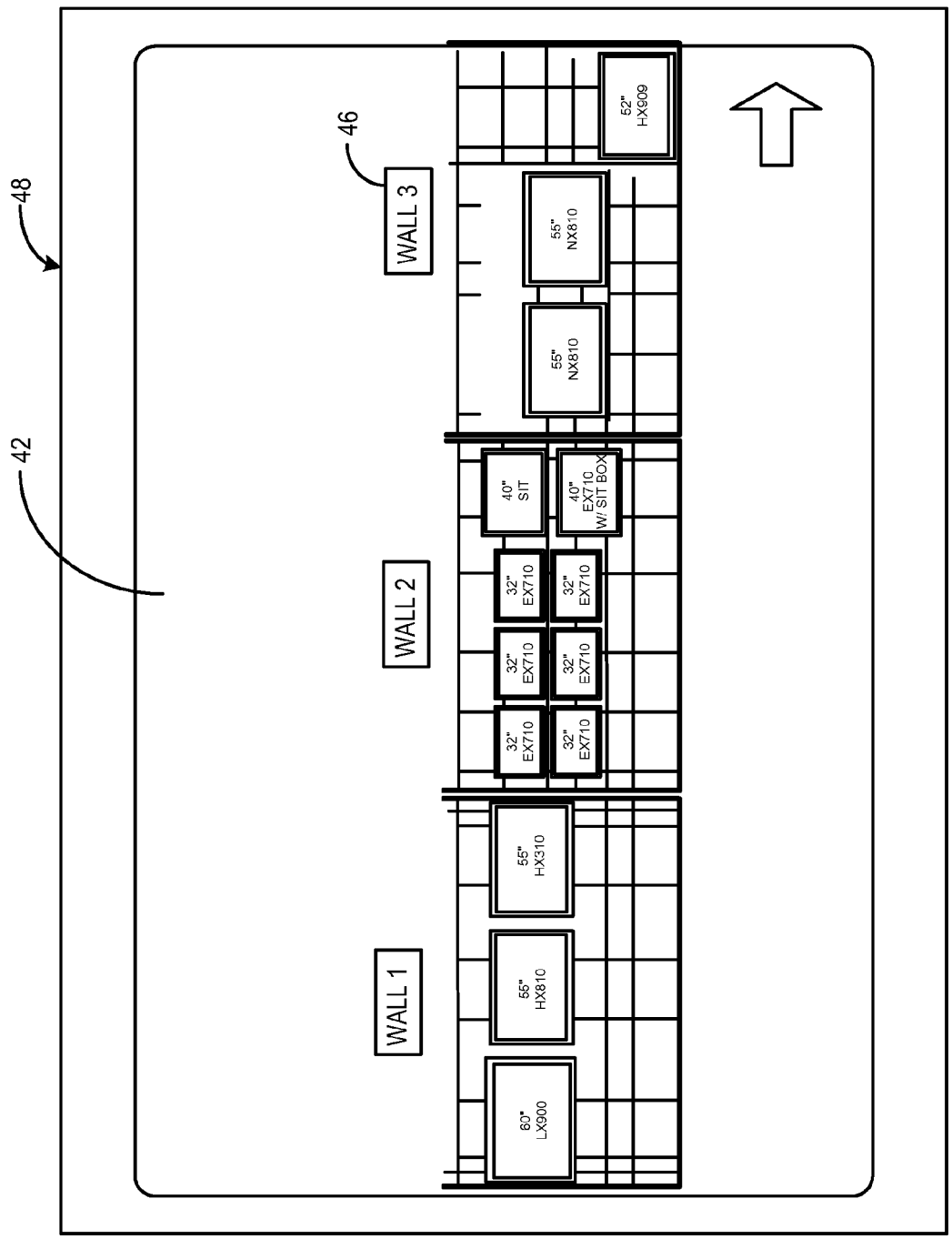
FIG. 2 is an example of a user interface home screen depicting the store walls in a manner consistent with certain embodiments of the present invention.

After page load the controlling device depicts the main (Store) screen or home screen as shown in FIG. 2. In the cases where the store's image is wider than controlling device's screen, the right-left scroll controls are used to expose additional screens. The example screen has five walls of which three are shown and all are accessible. All of the walls are "clickable" so that by touching any of those "walls" control signals are directed to control of the selected particular Wall screen.

Figure 3:
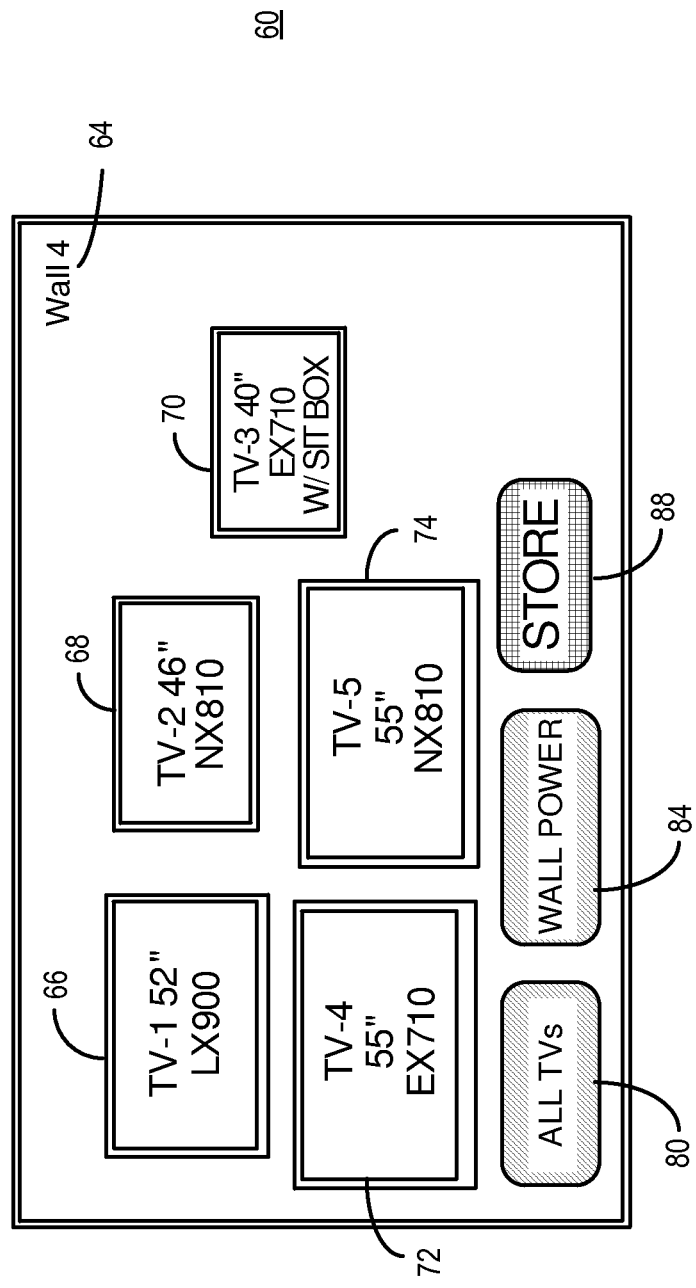
FIG. 3 is an example of a wall screen of a user interface consistent with certain embodiments of the present invention.

For purposes of this example, assume that wall 4 is selected. Upon selection of the wall 4, the display changes to depict a representation of wall 4 on the wall remote control display as shown as 60 in FIG. 3. In this example, the screen 60 has the following components:

Wall name 64 (number) on top;
Individual TV displays 66, 68, 70, 72 and 74 in the middle;
"ALL TVs" button 80 to control all TVs on this wall simultaneously;
WALL POWER 84 button; and
STORE button 88.

Touching STORE button 88 will bring the display back to main screen of FIG. 2. Touching WALL POWER button 84 will direct you to Wall Power Control Screen. (Definition provided later). Touching individual screen button 66, 68, 70, 72 or 74 or ALL TVs button 80 redirects the display to an "Inputs" screen, where the user can switch individual or all TVs to a desired input. Those screens are wall-specific and lists all inputs, available for on this Wall/Podia.

Figure 4:
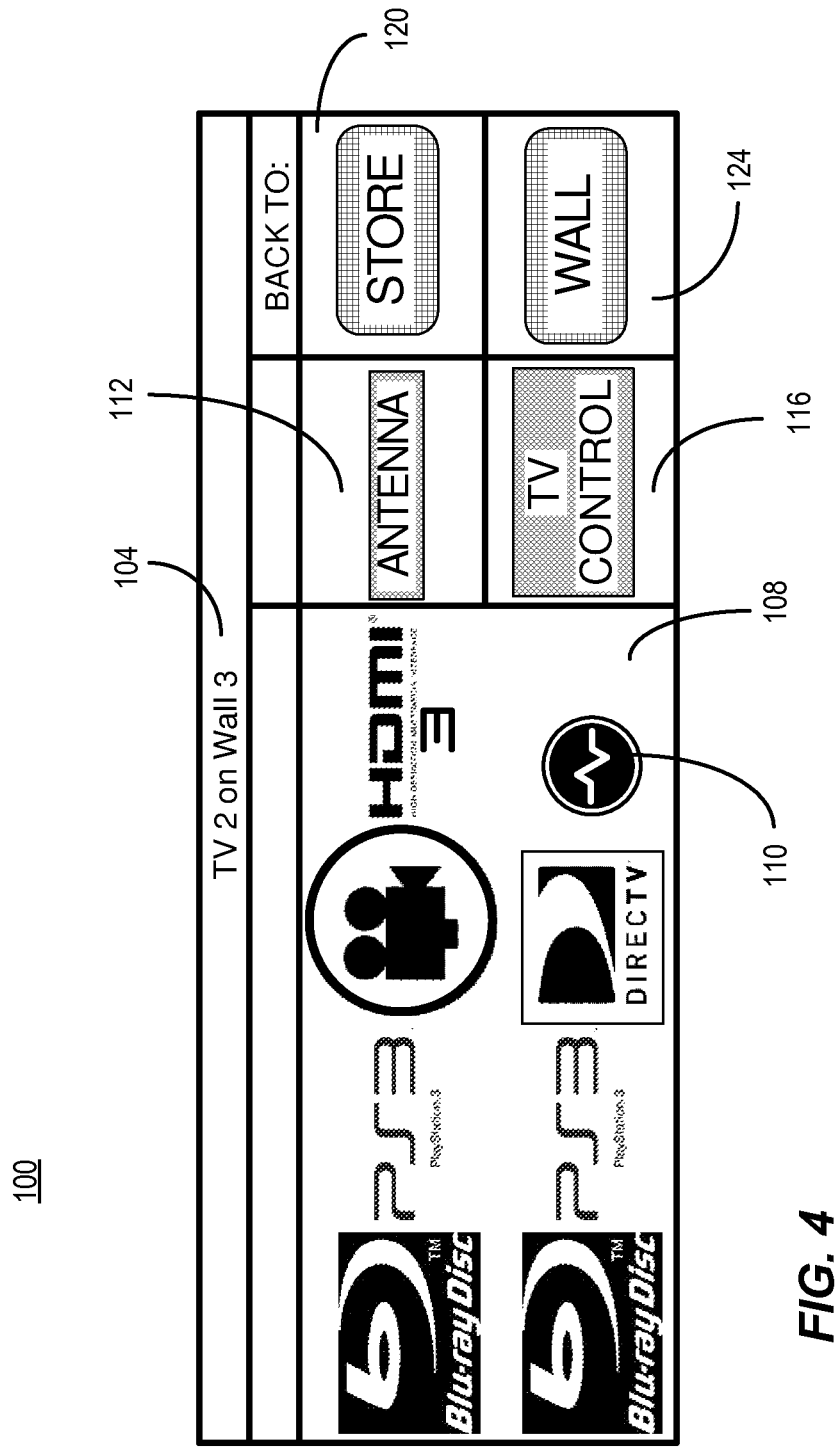
FIG. 4 is an example of an input selection screen consistent with certain embodiments of the present invention.

For illustrative purposes, assume that TV 68 is selected on Wall 3. FIG. 4 depicts an image 100 of an INPUT screen for TV 68. This screen permits selection of any of the available inputs or controls for the selected TV. The input screen 100 screen in the present implementation has the following components:

TV and Wall name 104 on top of screen;
Touchable Input Icons 108 for all available inputs on left side including "pulse" input 110.
ANTENNA button 112
TV CONTROL button 116
STORE button 120
WALL button 124

Touching any of available input icons 108 will switch TV-2 to this particular input. It should be noted that touching this button not only switches the selected TV or TVs to a particular input, but also sends commands to a special signal switcher (router) to route particular source to the selected TV. This input could be HDMI, RF, Component or Composite signal or any other transport for the corresponding input. Also, it should be noted, that the set of available inputs is dependent upon the particular setup that is used to produce the demonstration and could include any conceivable source of audio/video content.

In this particular example implementation, "HDMI 3" is available for each TV and is reserved for any equipment placed directly under it or otherwise nearby for convenient connection and selection of such a device. Touching the "PULSE" button 110 switches the controlled TV to HDMI-2 (which in certain preferred implementations is reserved for a Digital Signage player used for advertising and special display material). Touching the "ANTENNA" button 112 switches the controlled TV to a TV's internal RF-tuner input (Generally to the last tuned channel). Touching the "Wall" button 120 takes the display back to the prior display of walls. Touching the "TV CONTROL" button 116 brings up a TV CONTROL screen with buttons used to control the particular selected TV such as TV-2 in this example.

Figure 5:
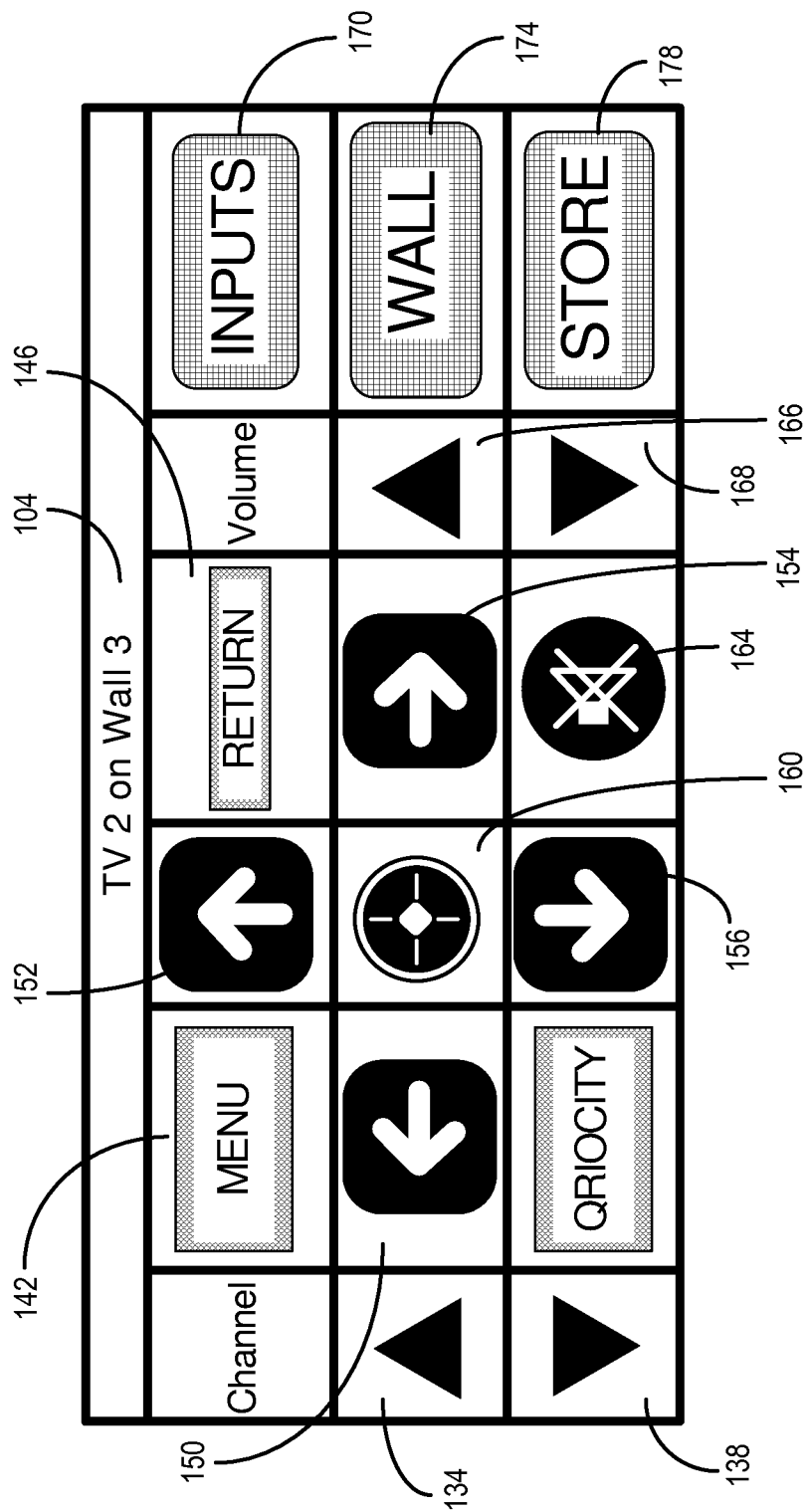
FIG. 5 is an example of a TV control screen consistent with certain embodiments of the present invention.

An example TV CONTROL screen 130 is depicted in FIG. 5. The TV and Wall continue to be identified at 104. ICONS on this screen allow the user to:

Change Channels UP/DOWN (blue triangles UP/DOWN on left) with icons 134 and 138. (It is noted that some devices such as pure displays might not have a tuner, and therefore will not need or be able to utilize a Channel UP/DOWN button. In this case, the control device display can either omit the button, or the button can simply not function or be marked as non-functional as desired for a particular implementation.)
A MENU button 142 brings the TV's built in menu system up on the TV's screen.
A RETURN button 146 is used to exit from the TV's menu.
ARROWS up/down/left/right buttons 150, 152, 154 and 156 around CONFIRM button 160 are provided to navigate the TV's menu and make selections,
MUTE button 164 mutes the audio.
Change Volume UP/DOWN 166 and 168 (blue triangles UP/DOWN on right) are touched to change the TV's volume level. (It is noted that some devices such as pure displays might not have audio capabilities, and therefore will not need or be able to utilize a Volume UP/DOWN button. In this case, the control device display can either omit the button, or the button can simply not function or be marked as non-functional as desired for a particular implementation.)
INPUTS, WALL and STORE buttons 170, 174 and 178 take the user back to INPUTS/WALL/STORE levels of the control hierarchy.

Figure 8:
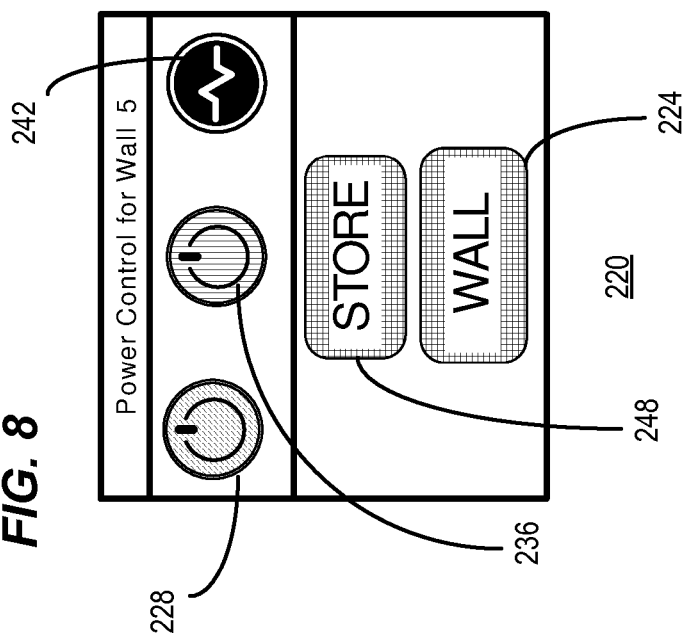
FIG. 8 is an example of a wall power control panel consistent with certain embodiments of the present invention.
Figure 7:
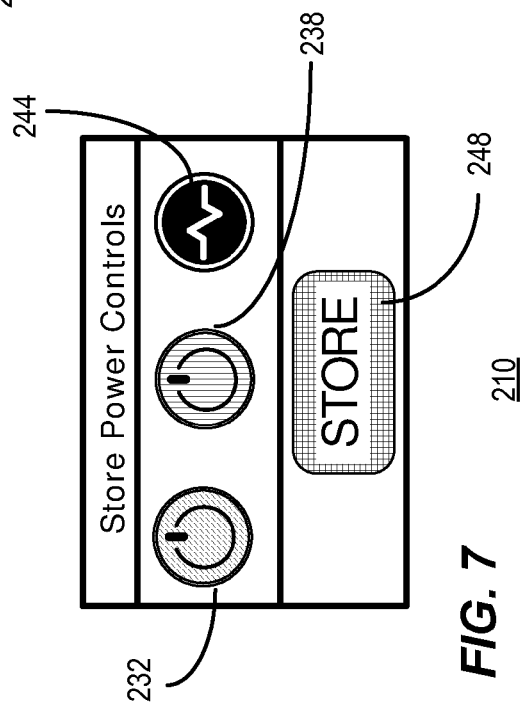
FIG. 7 is an example of a store power control panel consistent with certain embodiments of the present invention.
Figure 6:
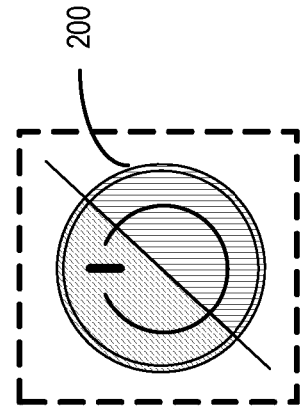
FIG. 6 is an example of a power Icon consistent with certain embodiments of the present invention.

In certain preferred implementations, on rightmost side of main (Store) screen there is a Power ON/OFF button as depicted as 200 of FIG. 6. Touching this button 200 takes the user to the "Store Power Control" screen, an example of which is shown in FIG. 7 as 210. This screen 210 is similar to the "Wall Power Control" Screen 220 of FIG. 8. The difference between screens 210 and 220 is only in that the "WALL" button 224 on Wall Power control screen, brings the user back to Wall Screen. Touching the Green "Power ON" button 228 or 232 turns ON all TVs on controlled Wall or on all walls respectively. Touching the Red "Power OFF" button 236 or 238 turns OFF all TVs on controlled Wall or on all 5 walls respectively. Touching the Black "PULSE" button 242 or 244 switches TVs on controlled Wall or on all 5 walls to HDMI2 (Digital Signage player) respectively. Touching store button 248 takes the user back to the main (home) store screen.

Figure 9:
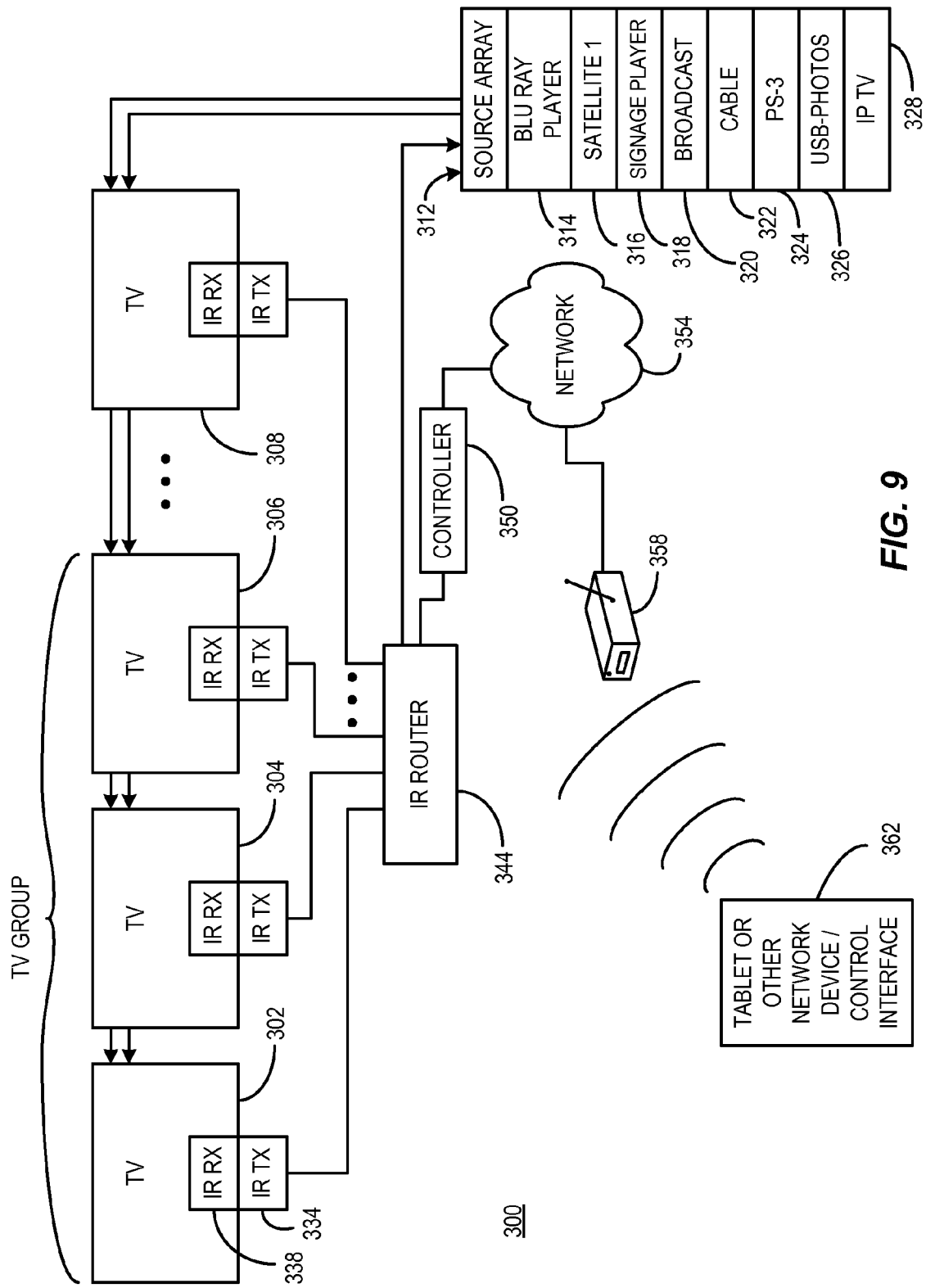
FIG. 9 is an example of a demonstration control system using infrared control in a manner consistent with certain embodiments of the present invention.

Referring now to FIG. 9, an example TV demonstration system is depicted in block diagram form as system 300. In this system, a collection of television sets 302, 304, 306, . . . 308 are arranged in groups such as Walls as described above (with one example group shown in FIG. 9), with one or more of the television sets being on each wall. Each of the television sets are connected to an array or plurality of content sources 312, but each television set might not have access to each of the content sources in array 312. Further, however, each of the content sources can be switchable using a switching system (not shown) to assure maximum flexibility in providing content sources to the television sets 302 . . . 308. By way of example, and not limitation, the source array 312 may include a Blu Ray disc player 314, one or more satellite receivers 316, a digital signage player 318, a broadcast television antenna 320, a cable television receiver box 322, a game console such as a Sony PlayStation™ 3 324, a universal serial bus storage device storing still images or videos or other content 326 or an Internet Protocol TV (IPTV) converter device 328. Other possible devices include, but are not limited to, Personal Video Recorder (PVR), Video cameras, IP routers or modems, video tape players, etc. In certain implementations, these sources may be controlled by use of the same techniques employed to control the television sets as described above by providing a set of controlling codes and routing the control to each respective source device in the array 312.

In this implementation, IR signals are used to control each television set (and potentially the source devices also). To assure that there is no IR signals intended for one TV that is received by others, each TV is equipped with an IR transmitter 334 that is placed in close proximity to the TV's remote control IR receiver 338. IR shutters can be used to turn on and off any output to a particular TV, or as in the implementation depicted, an IR router 344 is used to route the IR signals to the specified TV or TVs. In this case, each transmitter receiver pair 334 and 338 for each TV is optically sealed in any suitable manner so that signals from one IR transmitter can only be received by one IR receiver.

IR control signals are transmitted to each TV or group of TVs as selected by the user by the IR router 344 that operates under control of a controller device 350 such as a programmed computer. In certain implementations, a commercially available Waci™ processor from Aurora Multimedia can be used to carry out the function of both the IR router 344 and the controller 350, or the controller 350 can be implemented using a networked server. Any suitable combination of devices serving the respective purposes of the router and the server can be used without limitation. As shown, the controller 350 is connected either using a wired or wireless connection (e.g., Ethernet™) to a network 354 (e.g., a local area network) which receives commands via a wireless router or wireless access point 358 from the controller device (e.g., a tablet or smart phone) 362.

In operation, the control device 362 can serve as an interface to control the television demonstration in the manner previously described. Initially, the control device 362 uses an internal browser to call up a web page identified by an IP address. This can be done as an Icon on the control device 362's display. When this IP address is called, it is retrieved from controller 350 to provide the home page (Store) screen as described above. In certain implementations, the actual store configuration and television description along with control signals for controlling each TV is stored in a database in controller 350, so that when the user enters a command by the touch-screen display of control device 362, it is received at wireless router 358 and transferred via the network 354 to the controller 350. When a command is issued by the user at 362 to control one or more television sets or walls, the controller 350 then instructs the IR router to send an appropriate command to one or more of the television sets. Such commands may be sequentially sent to one TV after the other when more than one TV is selected, or may be sent substantially simultaneously. For this process, the user command is used as an entry point into the database of controller 350 which retrieves the IR signals for each selected TV and sends those commands as IR signals via the IR router 344 to control the selected TV or TVs without affecting unselected TVs.

Figure 10:
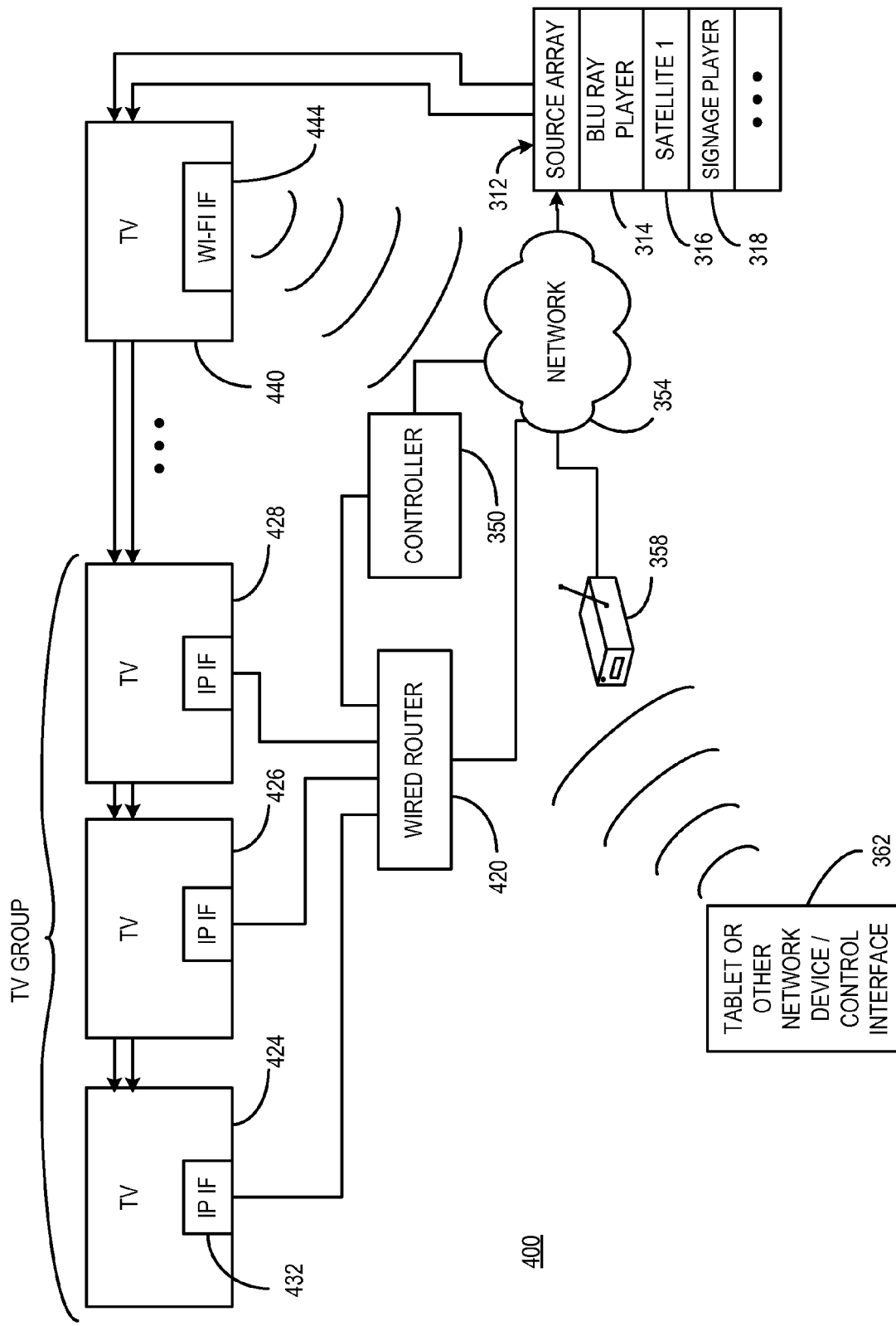
FIG. 10 is an example of a demonstration control system using network control in a manner consistent with certain embodiments of the present invention.

Another implementation is depicted as 400 in FIG. 10 in which IP signals are used throughout to control the TV sets, but it will be appreciated that a hybrid of this implementation and the implementation of system 300 is also contemplated.

Figure 11:
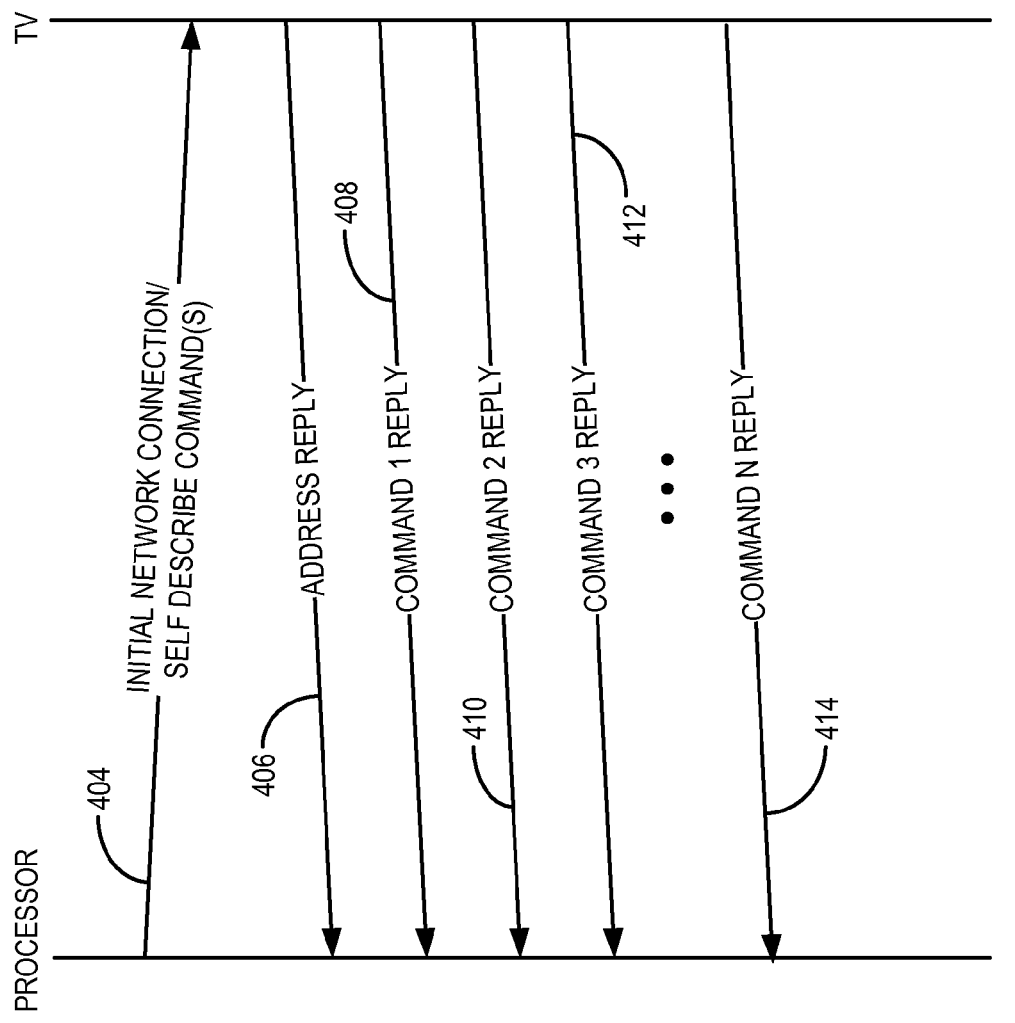
FIG. 11 is an example of a signal flow diagram depicting self description in a manner consistent with certain embodiments of the present invention.

Many TVs are as of this writing becoming IPTV compatible and provide network access via an Ethernet connection or via a wireless adapter. In the future, it is contemplated that this trend will continue. In these cases, it is generally the case that a television or other device can "self-identify" thereby providing its IP address or other addressing information, along with a listing of commands that are understood by the particular TV via IP commands. This capability is relatively standard using universal plug and play (uPnP) functionality. But can also be invoked by a processor request for the TV or other device to self-identify. This process is depicted in the signal flow diagram of FIG. 11 in which an initial connection of the TV to the network or a command from processor 350 induces the TV to self-describe at 404. The TV responds first at 406 with its identity which may include an IP address, MAC address, model number, serial number, etc. This is followed by a sequential listing of the commands that the TV understands at 408, 410, 412, . . . 414 with replies that characterize the television set's command set that is available with IP commands. As noted above, while stateful commands can be used, stateless commands are of primary interest since these commands will directly invoke the desired response without potential for confusion. While the signal flow diagram of FIG. 11 suggests that multiple replies are received, in fact that reply may be in the form of a single message, but is depicted in this manner for ease of understanding.

Once all devices are described in the database of processor 350, the user may issue commands from the control device 362 such as a tablet computer. User commands are then translated to IP commands that are routed to the target TV or TVs via an IP router 420. The IP router is connected via a wired connection to the TV sets that it controls. So, for example as shown, the TV group having TVs 424, 426 and 428 each have an IP interface (IP-IF) such as 432 which is connected to the wired router 420 for control. It is also possible to control TVs or other devices such as TV 440 which is equipped with a wireless interface 444 by appropriately addressing the wireless interface in a conventional manner and in each case issuing IP commands directly to the addressed TV in order to implement the user command issued at the controlling device 362.

It should be noted that in some implementations, a "hybrid" approach can be utilized. In such an approach, IR control can be utilized to control those devices that cannot directly accept IP commands (or for whatever reason are more conveniently controlled using IR) while other devices can be controlled using either wired or wireless IP commands without limitation. Moreover, in other implementations the devices can be controlled using Serial ports, USB ports or IEEE 1394 ports or any other suitable interface including non-standard interfaces as is suitable to the device being controlled. Such interfaces can be used either individually or in any suitable hybrid without limitation.

Figure 12:
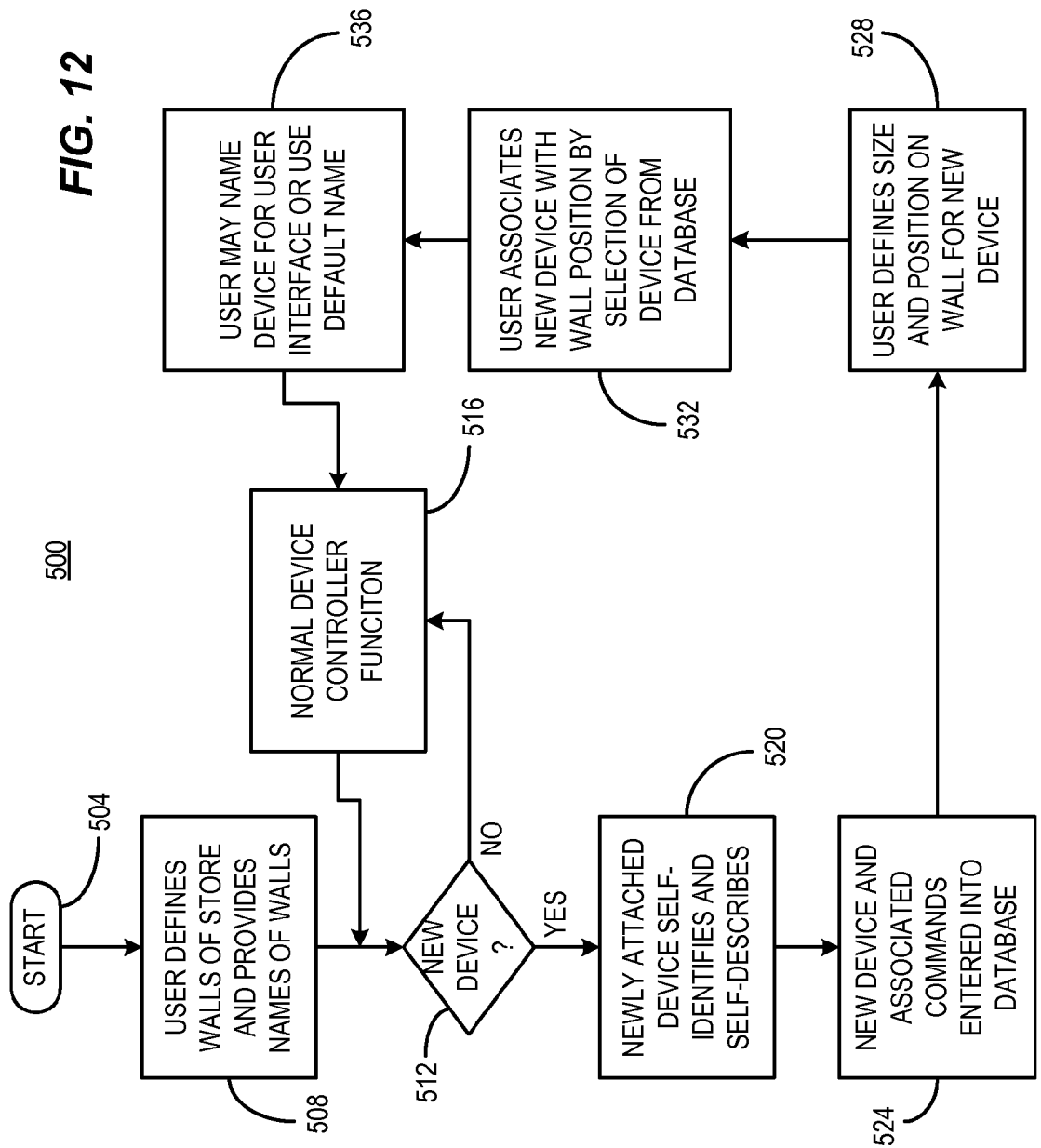
FIG. 12 is an example of a flow chart of a process for definition of a store in a manner consistent with certain embodiments of the present invention.

FIG. 12 depicts a process of self-description of a newly connected device in process 500 starting at 504. At 508, the user defines walls of the store and provides names for the walls. This can be carried out in any number of ways. The simplest may be to simply provide a number of walls to be defined. With this number in place, the processor can simply provide a layout of side by side walls with user then provided with the opportunity to name each wall. Once the basic store is defined by definition of a plurality of walls (keeping in mind the broad description of the term "wall") the television sets may begin the self description process. At this point the process awaits at 512 the connection of a new device to the network. Until a new device is attached and appropriately configured, any prior device definitions may be utilized at 516 to carry out normal controller functions.

It may be desirable, once the store is defined, to issue a command to self-identify in the event devices are already connected to the network. In any case, when a new device is identified at 512, the new device self-identifies and self-describes its command set at 520. The new device is then entered into the database along with its associated commands and signals that induce such commands at 524. At 528, the user can define the size and position on each wall for connected devices such as the newly discovered and self-identified device. The user can then associate devices such as the newly self-identified device with a position on the wall at 532. To do so, the user selects the device from the database for its defined wall position. The user may name the device at 536 to provide for convenient reference or may use a default name such as a model number provided in the self-identification process. Once the device is added to the wall, normal controller function can resume at 516.

In alternative implementations, once a device is defined in the database, it can be placed on a given wall by use of a drag and drop process where the size of the device can either be stretched or shrunk as required, or the size may be an attribute stored in the database. Other variations will occur to those skilled in the art upon consideration of the present teachings with the only constraints being to provide a graphically representative store definition.

Figure 13:
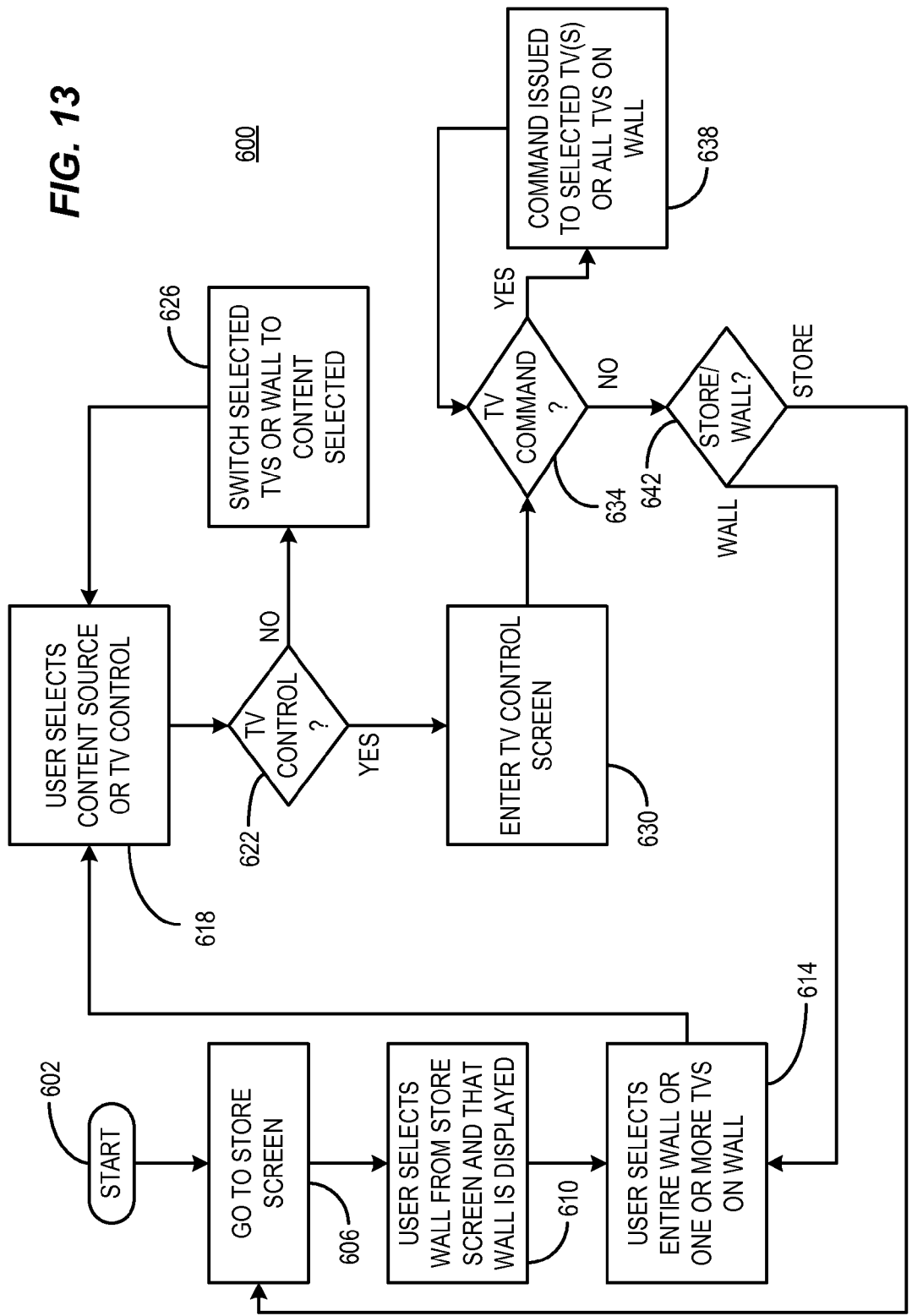
FIG. 13 is an example of a process for control of one or more TV devices in a manner consistent with certain embodiments of the present invention.

Once the store is defined and all TVs and other devices are defined, the control process can be carried out. A simplified version of the operation of the control process is depicted as 600 of FIG. 13 starting at 602. At 606, the process is initiated by display of the store screen (home or main screen). The user can then select a wall from the store screen at 610 and that particular wall screen is displayed. At this point, the user can select either the entire wall or one or more TVs on the wall at 614. Also at this screen, the user can carry out other functions not shown for simplification of the description such as returning to the store screen.

Once the wall or TV(s) are selected at 614, the user can select the content source or elect to control the selected TV or TVs (or wall of TVs) at 618. If a TV control command is not issued at 622, the user can change TVs or Wall or content source at 626 using the various commands discussed previously. If a TV control command is selected at 622, the user enters the TV control screen at 630 where the user can issue commands that control the selected TV or TVs at 634 and such commands are directed in appropriate form (e.g., IR or IP) to the controlled TV or TVs (or wall) at 638. If, however, the user elects to not issue a TV command at 634 but instead issues a wall or store command at 642, the process takes the user to the store screen at 606 or the wall screen at 614.

As will be apparent from the prior discussion, the user can at any point return to the store screen or issue various power commands or otherwise navigate about the user interface. As such, those skilled in the art will appreciate that the present discussion of process 600 is simplified to provide a basic overview of the operation of the process and should not be considered limiting.

The process consistent with certain embodiments may be generalized as is depicted in process 700 of FIG. 14 starting at 704. On initial use at least, the store is defined and subsequently may be redefined at 708 as required when the TV display changes. Once the store is defined, the controller awaits a command at 712 from the store screen. When a command is issued at 712, the user can select a new target TV or TVs if desired at 716. While generally the user would either select a wall or selected TV or TVs on a single wall, this is not to be considered limiting since selection of a target can include selection of one or more television sets or groups of television sets from the store while leaving other unselected TV or TVs or walls unselected, or the user may select the whole store at 720.

If a new target is not to be selected at 716, a source may be selected at 724 in which case user commands select one of the content sources for the selected TV or TVs or wall at 728. This results in sending signals that cause the selected content to be routed to the selected one or more TVs or groups of TVs or walls at 732 so as to provide for the same content selection to be viewed simultaneously on all of the selected TVs.

Other commands can be issued if desired at 736 if no new target is to be selected at 716 and no source is to be selected at 724. For example, at 736, commands can be directed to the content source at 740 resulting in signals being directed to a particular content source to implement the desired command at 744. Otherwise, at 736, the user may choose to issue a TV control command resulting in signals being sent (e.g., consecutively to each selected TV) that implement a TV command specific to the selected group of TVs or in the case of TV specific commands to TVs that are capable of implementing the command at 750. After implementing each type of command, control can return to 712 to await a new command.

It is noted that the above implementations utilize a networked controller 350 to carry the database of attached devices and to serve as a controller to implement the commands issued by the user. However, those skilled in the art will appreciate upon consideration of the present teachings that the controller 350 may be omitted in favor of programming the store configuration and control commands as a freestanding application running on the control device 362 without limitation. Additionally, any logical subdivision of functionality can be devised between the controlling device 362 and the controller 350 without limitation. For example, the store can be defined and reside as a database within the controller 350 and all other functionality carried out in the controlling device 362. In this example, the information can be retrieved as needed from the database of controller 350, or may be retrieved as a download from the database when the application is initiated with all further functions being carried out at the controlling device 362. Additionally, it is reiterated that while the present discussion has focused upon control of television sets, the teachings are applicable to other controllable electronic devices including video games and other home entertainment devices by making logical substitution of applicable commands for such devices. Many variations are possible without departing from embodiments consistent with the present invention.

It is further noted that all processors described herein may be of conventional architecture with interface, memory, one or more processors etc. It will be further appreciated that many variations in the architecture will occur to those skilled in the art without departure from embodiments consistent with the present invention. It is further noted that in some cases a TV or other controller devices should be registered to a particular TV in order to control that TV (or other controlled device such as a controllable electronic device). This problem is addressed by registering the server or other programmed processor that issues the commands to the TV or other controlled device. While the present discussion has focused upon use of the present arrangement to control TV sets, a similar arrangement can be devised in accord with the present teachings for demonstration of other controllable devices without limitation.

Thus, in certain implementations, a television demonstration arrangement for controlling a plurality of television sets arranged on walls where a plurality of content sources can be coupled to the television sets has one or more programmed processors. A control interface is adapted to receive user commands. The processors are programmed to, upon receipt of user commands: select one or more television sets or groups of television sets while leaving others of the television sets unselected; select one of the content sources; and send signals that cause the selected content sources to be displayed by the selected one or more television sets or groups of television sets without affecting operation of unselected television sets or groups of television sets.

A demonstration arrangement for controlling a plurality of television sets or other controllable electronic devices has one or more programmed processors. A control interface is adapted to receive user commands. The processors are programmed to, upon receipt of user commands: select one or more television sets or groups of television sets while leaving others of the television sets unselected; select one of the content sources; and send signals that cause the selected content sources to be displayed by the selected one or more television sets or groups of television sets without affecting operation of unselected television sets or groups of television sets.

A television demonstration arrangement for controlling a plurality of television sets arranged in a plurality of groups of television sets where a plurality of television content sources coupled to the plurality of television sets in an arrangement consistent with certain implementations has one or more programmed processors. A control interface is adapted to receive user commands. The one or more programmed processors are programmed to carry out the following actions upon receipt of user commands: select one or more television sets or groups of television sets while leaving others of the television sets or groups of television sets unselected; select one of the content sources for the selected one or more of the television sets or groups of television sets; and send signals that cause the selected content sources to be displayed by the selected one or more television sets or groups of television sets without affecting operation of unselected television sets or groups of television sets.

In certain implementations, the one or more programmed processors are further programmed to receive user commands to carry out television set specific functions and send signals that implement functions specific to the selected television set or group of television sets without affecting operation of unselected television sets or groups of television sets. In certain implementations, the selecting of one or more television sets or groups of television sets involves: selecting a wall having multiple television sets residing on the wall; and selecting either the entire wall of television sets or selecting one or more of the television sets residing on the wall. In certain implementations, the signals are sent to the selected television sets via infrared (IR) remote control signals via an infrared signal router. In certain implementations, the IR remote control signals are isolated by shuttering so that each selected television set receives only IR remote control signals addressed to that selected television set and none of the other television sets in the plurality of television sets. In certain implementations, the signals are sent to the selected television sets via a local area network. In certain implementations, the signals are addressed so that each selected television set or group of television sets respond only to signals addressed to that selected television set or group of television sets and none of the unselected television sets in the plurality of television sets responds to the signals. In certain implementations, the user interface comprises a touchscreen display device. In certain implementations, the plurality of television sets are arranged in groups of television sets according to a retail display layout, with each group of television sets corresponding to television sets mounted to a retail display wall. In certain implementations, each display wall is associated with a television display size class.

In certain implementations, the one or more programmed processors are further programmed to sequentially send signals that implement the commands to each television set in a group when a group of a plurality of television sets is selected without affecting operation of unselected television sets or groups of television sets. In certain implementations, the signals sent to the one or more television sets or groups of television sets comprise stateless commands. In certain implementations, the one or more programmed processors are further programmed to receive user commands to carry out functions specific to a selected content source and send signals that implement the functions specific to the selected content source to the selected content source. In certain implementations, the addresses and the signals corresponding to the user commands are obtained from at least one of the television set by sending a command to the television set requiring the television set to self describe. In certain implementations, the signals corresponding to the user commands are stored in a database.

Another television demonstration arrangement has a plurality of television sets arranged in a plurality of groups of television sets. A plurality of television content sources are coupled to the plurality of television sets. One or more programmed processors and a touchscreen display control interface are adapted to receive user commands. The one or more programmed processors are programmed to carry out the following actions upon receipt of user commands: select one or more television sets or groups of television sets while leaving others of the television sets or groups of television sets unselected; select one of the content sources for the selected one or more of the television sets or groups of television sets; send signals that cause the selected content sources to be displayed by the selected one or more television sets or groups of television sets without affecting operation of unselected television sets or groups of television sets; receive user commands to carry out television set specific functions and send signals that implement functions specific to the selected television set or group of television sets without affecting operation of unselected television sets or groups of television sets; and where the signals are sent to the selected television sets via infrared (IR) remote control signals via an infrared signal router.

In certain implementations, the plurality of television sets are arranged in groups of television sets according to a retail display layout, with each group of television sets corresponding to television sets mounted to a retail display wall. In certain implementations, the selecting of one or more television sets or groups of television sets involves: selecting a wall having multiple television sets residing on the wall; and selecting either the entire wall of television sets or selecting one or more of the television sets residing on the wall. In certain implementations, each display wall is associated with a television display size class. In certain implementations, the one or more programmed processors are further programmed to sequentially send signals that implement the commands to each television set in a group when a group of a plurality of television sets is selected without affecting operation of unselected television sets or groups of television sets. In certain implementations, the signals sent to the one or more television sets or groups of television sets comprise stateless commands. In certain implementations, the programmed processor is further programmed to receive user commands to carry out functions specific to a selected content source and send signals that implement the functions specific to the selected content source to the selected content source. In certain implementations, the signals corresponding to the user commands are stored in a database.

Another television demonstration arrangement has a plurality of television sets arranged in a plurality of groups of television sets. A plurality of television content sources are coupled to the plurality of television sets. One or more programmed processors and a touchscreen control interface adapted to receive user commands. The one or more programmed processors are programmed to carry out the following actions upon receipt of user commands: select one or more television sets or groups of television sets while leaving others of the television sets or groups of television sets unselected; select one of the content sources for the selected one or more of the television sets or groups of television sets; send signals that cause the selected content sources to be displayed by the selected one or more television sets or groups of television sets without affecting operation of unselected television sets or groups of television sets; receive user commands to carry out television set specific functions and send signals that implement functions specific to the selected television set or group of television sets without affecting operation of unselected television sets or groups of television sets; and where the signals are sent to the selected television sets via a local area network.

In certain implementations, the signals are addressed so that each selected television set or group of television sets respond only to signals addressed to that selected television set or group of television sets and none of the unselected television sets in the plurality of television sets responds to the signals. In certain implementations, the selecting of one or more television sets or groups of television sets involves: selecting a wall having multiple television sets residing on the wall; and selecting either the entire wall of television sets or selecting one or more of the television sets residing on the wall. In certain implementations, the plurality of television sets are arranged in groups of television sets according to a retail display layout, with each group of television sets corresponding to television sets mounted to a retail display wall. In certain implementations, each display wall is associated with a television display size class. In certain implementations, the one or more programmed processors are further programmed to sequentially send signals that implement the commands to each television set in a group when a group of a plurality of television sets is selected without affecting operation of unselected television sets or groups of television sets. In certain implementations, the signals sent to the one or more television sets or groups of television sets comprise stateless commands. In certain implementations, the one or more programmed processors are further programmed to receive user commands to carry out functions specific to a selected content source and send signals that implement the functions specific to the selected content source to the selected content source. In certain implementations, the addresses and the signals corresponding to the user commands are obtained from at least one of the television set by sending a command to the television set requiring the television set to self describe. In certain implementations, the signals corresponding to the user commands are stored in a database.

Another electronic device demonstration arrangement for controlling a plurality of controllable electronic devices arranged in a plurality of groups of electronic devices has one or more programmed processors. A control interface adapted to receive user commands. The one or more programmed processors being programmed to carry out the following actions upon receipt of user commands: select one or more controllable electronic devices or groups of controllable electronic devices while leaving others of the controllable electronic devices or groups of controllable electronic devices unselected; and send signals that cause the selected controllable electronic devices or groups of controllable electronic devices to carry out functions specific to the selected controllable electronic devices or groups of controllable electronic devices without affecting the unselected controllable electronic devices or groups of controllable electronic devices.

Those skilled in the art will recognize, upon consideration of the above teachings, that certain of the above exemplary embodiments are based upon use of one or more programmed processors programmed with a suitable computer program. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage devices including, but not limited to non-transitory storage media such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. (In this case, the term "non-transitory" is use only in the sense that it excludes propagating signals and waves, but does not include storage devices that can be erased or that require power to store information.) Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television demonstration arrangement configured to control a plurality of television sets physically arranged in a plurality of groups of television sets where a plurality of television content sources is selectively coupled to the plurality of television sets, and where at least two of the plurality of the television sets are arranged in a common area within the range of a conventional remote controller, comprising:
   one or more programmed processors configured to operate as a controller;
   the controller having a control interface adapted to receive user commands;
   the controller being programmed to carry out the following actions upon receipt of user commands entered into the control interface:
      select one or more television sets or groups of television sets while leaving others of the television sets or groups of television sets unselected based upon user selection of one or more television sets or groups of television sets from the control interface, and where the control interface displays a representation of the physical arrangement of the plurality of television sets;
      select one of the content sources for the selected one or more of the television sets or groups of television sets based upon user selection of the one of the content sources from the control interface; and
      send signals that cause the selected content sources to supply input signals to the selected one or more television sets or groups of television sets for display without affecting operation of the unselected television sets or groups of television sets.

2. The arrangement according to claim 1, where the controller is further programmed to receive user commands via the control interface to carry out television set specific functions and send signals that implement functions specific to the selected television set or group of television sets without affecting operation of unselected television sets or groups of television sets.

3. The arrangement according to claim 1, where the selecting of one or more television sets or groups of television sets comprises:
   selecting a wall having multiple television sets residing on the wall; and
   selecting either the entire wall of television sets or selecting one or more of the television sets residing on the wall.

4. The arrangement according to claim 1, where the signals are sent to the selected television sets via infrared (IR) remote control signals via an infrared signal router.

5. The arrangement according to claim 4, where the IR remote control signals are isolated by shuttering so that each selected television set receives only IR remote control signals addressed to that selected television set and none of the other television sets in the plurality of television sets.

6. The arrangement according to claim 1, where the signals are sent to the selected television sets via a local area network.

7. The arrangement according to claim 6, where the signals are addressed so that each selected television set or group of television sets respond only to signals addressed to that selected television set or group of television sets and none of the unselected television sets in the plurality of television sets responds to the signals.

8. The arrangement according to claim 1, where the user interface comprises a touchscreen display device.

9. The arrangement according to claim 1, where the plurality of television sets are arranged in groups of television sets according to a retail display layout, with each group of television sets corresponding to television sets mounted to a retail display wall.

10. The arrangement according to claim 9, where each display wall is associated with a television display size class.

11. The arrangement according to claim 1, where the controller is further programmed to sequentially send signals that implement the commands to each television set in a group when a group of a plurality of television sets is selected without affecting operation of unselected television sets or groups of television sets.

12. The arrangement according to claim 1, where the signals sent to the one or more television sets or groups of television sets comprise stateless commands.

13. The arrangement according to claim 1, where the controller is further programmed to receive user commands to carry out functions specific to a selected content source and send signals that implement the functions specific to the selected content source to the selected content source.

14. The arrangement according to claim 1, where the addresses and the signals corresponding to the user commands are obtained from at least one of the television set by sending a command to the television set requiring the television set to self describe.

15. The arrangement according to claim 1, where the signals corresponding to the user commands are stored in a database.

16. A television demonstration arrangement, comprising:
   a plurality of television sets physically arranged in a plurality of groups of television sets;
   a plurality of television content sources selectively coupled to the plurality of television sets;
   where at least two of the plurality of the television sets are arranged in a common area within the range of a conventional remote controller;
   one or more programmed processors configured to operate as a controller and a touchscreen display control interface adapted to receive user commands;
   the controller being programmed to carry out the following actions upon receipt of user commands entered into the control interface:
      select one or more television sets or groups of television sets while leaving others of the television sets or groups of television sets unselected based upon user selection of one or more television sets or groups of television sets from the control interface, and where the control interface displays a representation of the physical arrangement of the plurality of television sets;

select one of the content sources for the selected one or more of the television sets or groups of television sets based upon user selection of the one of the content sources from the control interface;

send signals that cause the selected content sources to supply input signals to the selected one or more television sets or groups of television sets for display without affecting operation of the unselected television sets or groups of television sets;

receive user commands via the control interface to carry out television set specific functions and send signals that implement functions specific to the selected television set or group of television sets without affecting operation of unselected television sets or groups of television sets; and where the signals are sent to the selected television sets via infrared (IR) remote control signals via an infrared signal router.

17. The arrangement according to claim 16, where the plurality of television sets are arranged in groups of television sets according to a retail display layout, with each group of television sets corresponding to television sets mounted to a retail display wall.

18. The arrangement according to claim 16, where the selecting of one or more television sets or groups of television sets comprises:
selecting, via the user interface, a wall having multiple television sets residing on the wall; and
selecting, via the user interface, either the entire wall of television sets or selecting one or more of the television sets residing on the wall.

19. The arrangement according to claim 18, where each display wall is associated with a television display size class.

20. The arrangement according to claim 16, where the controller is further programmed to sequentially send signals that implement the commands to each television set in a group when a group of a plurality of television sets is selected without affecting operation of unselected television sets or groups of television sets.

21. The arrangement according to claim 16, where the signals sent to the one or more television sets or groups of television sets comprise stateless commands.

22. The arrangement according to claim 16, where the controller is further programmed to receive user commands to carry out functions specific to a selected content source and send signals that implement the functions specific to the selected content source to the selected content source.

23. The arrangement according to claim 16, where the signals corresponding to the user commands are stored in a database.

24. A television demonstration arrangement, comprising:
a plurality of television sets physically arranged in a plurality of groups of television sets, where at least two of the plurality of the television sets are arranged in a common area within the range of a conventional remote controller,;
a plurality of television content sources selectively coupled to the plurality of television sets;
one or more programmed processors configured to operate as a controller and a touchscreen control interface adapted to receive user commands;
the controller being programmed to carry out the following actions upon receipt of user commands entered into the control interface:
select one or more television sets or groups of television sets while leaving others of the television sets or groups of television sets unselected based upon user selection of one or more television sets or groups of television sets from the control interface, and where the control interface displays a representation of the physical arrangement of the plurality of television sets;
select one of the content sources for the selected one or more of the television sets or groups of television sets based upon user selection of the one of the content sources from the control interface;
send signals that cause the selected content sources to supply input signals to the selected one or more television sets or groups of television sets for display without affecting operation of the unselected television sets or groups of television sets;
receive user commands via the control interface to carry out television set specific functions and send signals that implement functions specific to the selected television set or group of television sets without affecting operation of unselected television sets or groups of television sets; and
where the signals are sent to the selected television sets via a local area network.

25. The arrangement according to claim 24, where the signals are addressed so that each selected television set or group of television sets respond only to signals addressed to that selected television set or group of television sets and none of the unselected television sets in the plurality of television sets responds to the signals.

26. The arrangement according to claim 24, where the selecting of one or more television sets or groups of television sets comprises:
selecting, via the control interface, a wall having multiple television sets residing on the wall; and
selecting, via the control interface, either the entire wall of television sets or selecting one or more of the television sets residing on the wall.

27. The arrangement according to claim 24, where the plurality of television sets are arranged in groups of television sets according to a retail display layout, with each group of television sets corresponding to television sets mounted to a retail display wall.

28. The arrangement according to claim 27, where each display wall is associated with a television display size class.

29. The arrangement according to claim 24, where the controller is further programmed to sequentially send signals that implement the commands to each television set in a group when a group of a plurality of television sets is selected without affecting operation of unselected television sets or groups of television sets.

30. The arrangement according to claim 24, where the signals sent to the one or more television sets or groups of television sets comprise stateless commands.

31. The arrangement according to claim 24, where the one or more programmed processors are further programmed to receive user commands to carry out functions specific to a selected content source and send signals that implement the functions specific to the selected content source to the selected content source.

32. The arrangement according to claim 24, where the addresses and the signals corresponding to the user commands are obtained from at least one of the television set by sending a command to the television set requiring the television set to self describe.

33. The arrangement according to claim 24, where the signals corresponding to the user commands are stored in a database.

34. An electronic device demonstration arrangement for controlling a plurality of controllable electronic devices arranged in a plurality of groups of electronic devices where at least two of the plurality of the electronic devices are arranged in a common area within the range of a conventional remote controller, comprising:

one or more programmed processors configured to operate as a controller;

the controller having a control interface adapted to receive user commands;

the controller being programmed to carry out the following actions upon receipt of user commands via the control interface:

select one or more controllable electronic devices or groups of controllable electronic devices while leaving others of the controllable electronic devices or groups of controllable electronic devices unselected based upon user selection of one or more electronic devices or groups of electronic devices from the control interface, and where the control interface displays a representation of the physical arrangement of the plurality of electronic devices; and send signals that cause the selected controllable electronic devices or groups of controllable electronic devices to carry out functions specific to the selected controllable electronic devices or groups of controllable electronic devices without affecting the unselected controllable electronic devices or groups of controllable electronic devices.

* * * * *